United States Patent [19]

Solomon

[11] Patent Number: 4,669,691
[45] Date of Patent: Jun. 2, 1987

[54] ADJUSTABLE KEYBOARD STAND

[76] Inventor: Allen Solomon, 2029 E. 17th St., Brooklyn, N.Y. 11229

[21] Appl. No.: 682,240

[22] Filed: Dec. 17, 1984

[51] Int. Cl.⁴ ..................... F16M 11/00; G10G 5/00
[52] U.S. Cl. ................................. 248/165; 248/172; 403/385; 403/391
[58] Field of Search ................. 248/149, 150, DIG. 7, 248/121, 127, 188.8, 165, 173, 172; D17/9; 403/285, 199, 190, 237, 391, 385, 400, 387; 211/189–191; 182/178, 179

[56] References Cited

U.S. PATENT DOCUMENTS

| D. 127,594 | 7/1954 | Guichard | 248/165 |
|---|---|---|---|
| D. 257,987 | 1/1981 | Schoenig | D17/9 |
| 2,550,793 | 5/1951 | Ferriera | 248/165 |
| 2,628,803 | 2/1953 | Krewson | 248/172 |
| 2,679,413 | 5/1954 | Johnson | 403/385 |
| 2,905,126 | 9/1959 | Gaffey | 403/199 |
| 2,994,441 | 8/1961 | Browning | 211/189 |
| 3,642,285 | 2/1972 | Frischman | 248/150 |
| 3,674,262 | 7/1972 | Tomalinas | 248/430 |
| 3,749,414 | 7/1973 | Lynn | 248/DIG. 7 |
| 3,887,291 | 6/1975 | Langren | 403/391 |
| 3,945,291 | 3/1976 | Zickos | 403/391 |
| 4,129,912 | 12/1978 | Schlesinger | 40/152.1 |
| 4,443,128 | 4/1984 | Yamamoto | 403/385 |

FOREIGN PATENT DOCUMENTS 2292923  4/1974  France ........................... 211/189

Primary Examiner—Reinaldo P. Machado
Assistant Examiner—Alvin Chin-Shue
Attorney, Agent, or Firm—Caesar, Rivise, Bernstein, Cohen & Pokotilow, Ltd.

[57] ABSTRACT

An adjustable keyboard stand adapted to simultaneously support more than one keyboard in front of a musician and allow for immediate access to all of the supported keyboards. The tubular construction of the keyboard stand, which completely disassembles for easy transportation and storage, includes two side supports with at least one cross spar supported therebetween by a pair of cooperatively acting clamping means mounted on the side supports. The configuration of the pair of cooperatively acting clamping means, which support the cross spar in front of the plane formed by the front of the side supports, allows the distance between the side supports to be varied, while also allowing for easy positioning, installation and removal of additional cross spars without having to disassemble the stand.

6 Claims, 8 Drawing Figures

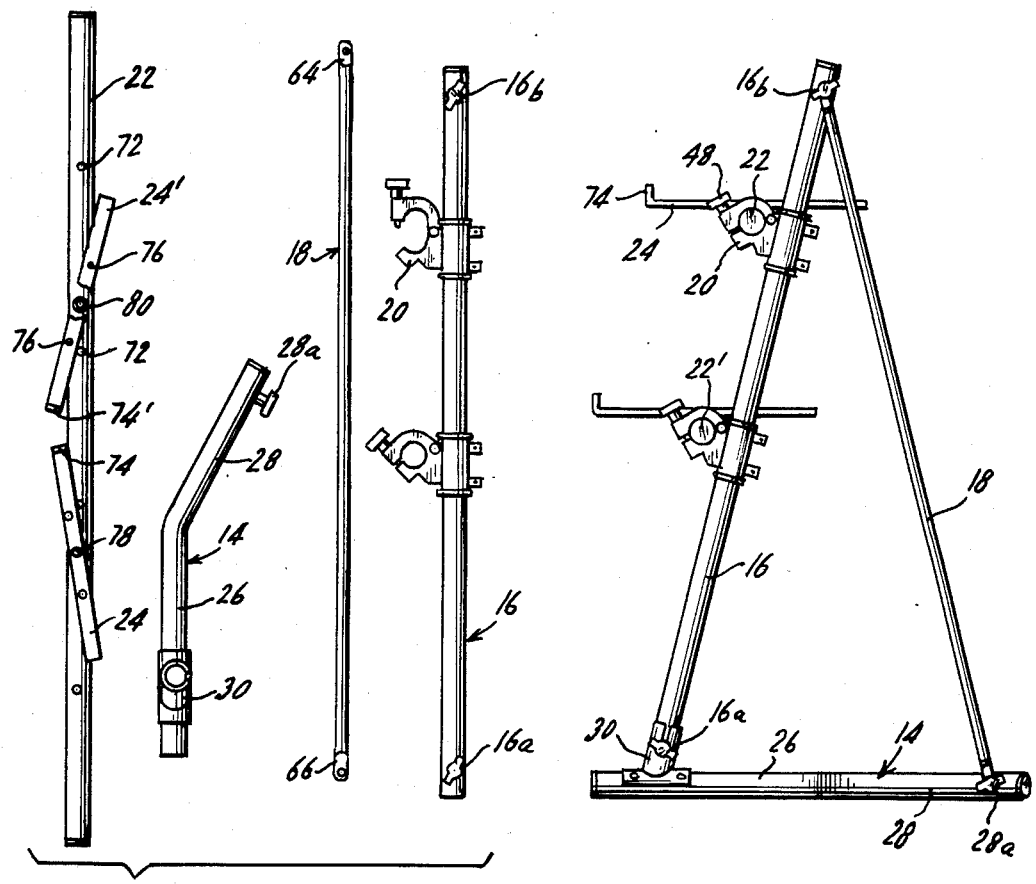
FIG. 4.
FIG. 3.
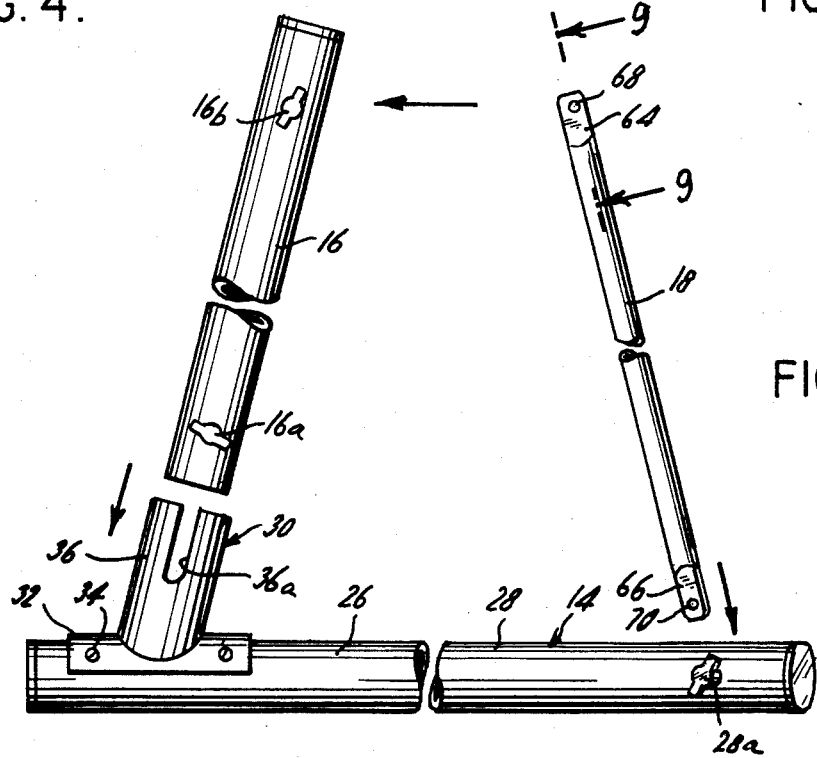
FIG. 5.

4,669,691

ADJUSTABLE KEYBOARD STAND

BACKGROUND OF THE INVENTION

This invention generally relates to an adjustable keyboard stand which can simultaneously position more than one keyboard in front of a musician so that the musician can have immediate access to a number of supported keyboards.

With the advent of electronic keyboards and the desire to simultaneously use more than one keyboard at a time, a device is needed to position two or more keyboards in front of a musician at the same time. Structures for this purpose have been designed in the past, such as that shown in U.S. Pat. No. Des. 257,987. U.S. Pat. No. Des. 257,987 discloses a keyboard stand having two triangular end supports hinged at the vertex and supported by cross bracing extending between the two rear sections of the end supports. Three cross spars are supported between the front sections of the two end supports with the ends of the cross spars terminating in "T" clamps mounted to the front sections of the end supports. Keyboard support members are mounted perpendicular to the three cross spars to support the keyboards. The base of the end supports in U.S. Pat. No. Des. 257,987 are hinged in the center thereof with the ends of the base adapted to pivot about the front and rear sections of the end supports so that the base can be folded upwards when the front section is folded towards the rear section for storage.

While U.S. Pat. No. Des. 257,987 allows multiple keyboards to be simultaneously supported in front of a musician, it cannot be adjusted to accomodate keyboards of different widths or permits additional keyboards to be quickly installed and removed from the stand without disassembling the stand. It also cannot be easily and completely disassembled for easy storage and transportation.

OBJECTS AND SUMMARY OF THE INVENTION

It is a general object of the present invention to provide a keyboard stand that simultaneously supports more than one keyboard.

Still further, it is an object of the present invention to provide a keyboard stand that can be adjusted to accommodate various widths of keyboards, and is supported laterally without the use of cross bracing.

It is a specific object of the present invention to provide a keyboard stand that completely and easily disassembles for easy storage and transportation.

It is a more specific object of the present invention to provide a keyboard stand with adjustable clamps that mount on the side supports and allow additional cross spars to be easily installed and removed from the stand and are easily positioned at any angle relative to the stand.

These and other objects are accomplished in accordance with the present invention in which an adjustable keyboard stand comprises at least two spaced apart side supports. Each side support including a base adapted to be supported on a horizontal surface, a first strut member and a second strut member. Each base has a front base section and a rear base section, the rear base section being formed at an obtuse angle relative to the front base section. The front base section is provided with a strut receiving member, such that the first strut member can be removably installed in the front base section by mounting to the strut receiving member. The second strut member is removably connected to the rear base section and removably connected to the first strut member to support the first strut member in an upright position. Clamp assembly means are adjustably mounted on each of the first strut members and include clamping jaws which extend in front of the plane formed by the first strut members. At least one cross spar extends between the two end supports and are clamped thereto at regions intermediate their ends in the clamping jaws of the clamp assembly means. Keyboard support means are pivotally mounted on the cross spar so that they can be positioned substantially parallel to the cross spar during storage and assembly or positioned non-parallel to the cross spar when supporting a keyboard. The clamp assembly means are formed to allow for quick and easy installation and removal of cross spars while allowing the cross spars to be positioned at any angle relative to the end supports. The clamp assembly means also allow for the distance between the side supports to be varied without changing the length of the cross spars. The angled construction of the base together with the second strut members, provide lateral support for the keyboard stand without the necessity for cross bracing between the side supports.

These and other objects of the invention will become more apparent to a worker skilled in the art upon reading the following detailed description taken in conjunction with the accompanying drawings.

BRIEF DESCRIPTION OF THE DRAWINGS

FIG. 3 is a side elevational view of the keyboard stand of the invention;

FIG. 4 shows one of each of the component parts of the keyboard stand of the invention, disassembled for storage and transportation;

FIG. 5 is a partial side elevational view illustrating the manner of assembly of the first strut member and the second strut member to the base;

DETAILED DESCRIPTION OF THE DRAWINGS

Figure 1:
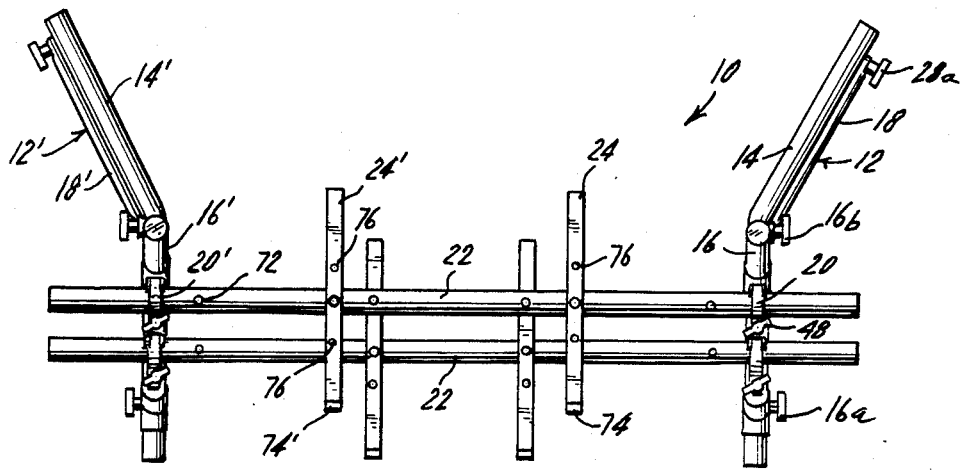
FIG. 1 is a top plan view of the keyboard stand of the invention.
Figure 2:
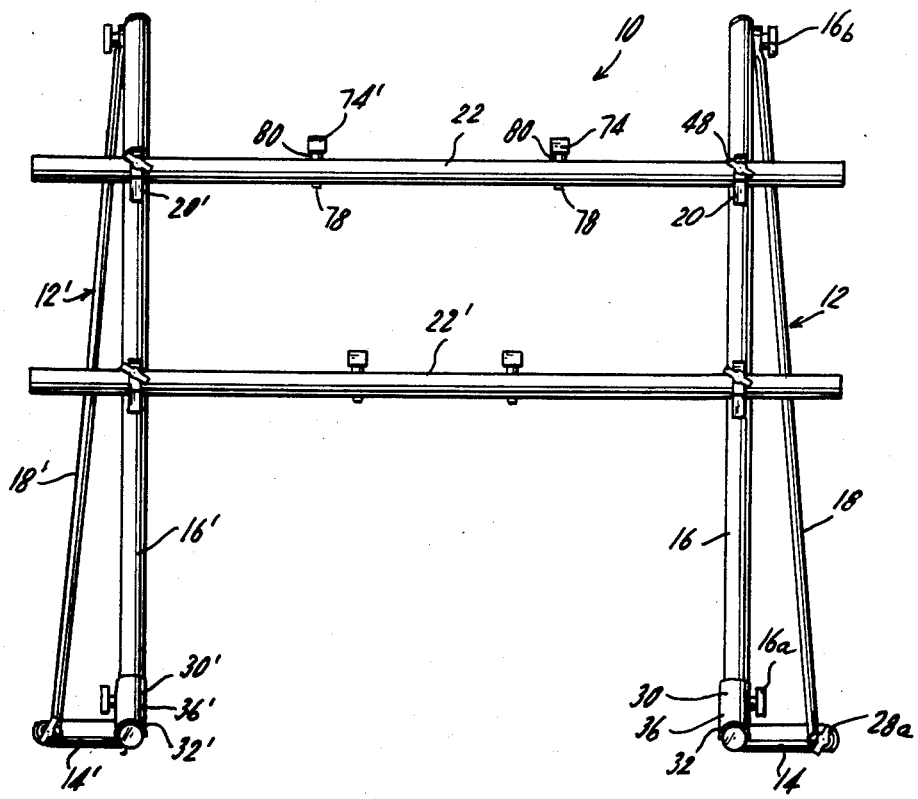
FIG. 2 is a front elevational view of the keyboard stand of the invention.

Referring to FIGS. 1, 2 and 3, keyboard stand 10 includes side supports 12, 12'. Side support 12 comprises base 14, first strut member 16, removably connected near one end of base 14, as will later be more fully described, and second strut member 18, removably connected near the opposite end of bases 14 and removably connected at the other end to first strut member 16 to support first strut members 16 in an upright position. Side support 12' includes the same elements as side support 12 which are indicated on the drawings by prime reference numerals. Clamp assembly means 20, 20' are adjustably mounted on first strut members 16, 16'. A first cross spar 22 is received in and supported by clamp assembly means 20, 20' in front of the plane formed by first strut members 16, 16'. Keyboard supports 24, 24' are pivotally mounted on cross spar 22 so that they can be positioned substantially parallel to cross spar 22 during storage and transportation or positioned non-parallel to cross spar 22 when acting to support a keyboard. A second cross spar 22' or further cross spars can be supported in a like manner.

When assembled, the keyboard stand 10 of the invention is adjustable to support keyboards at any height or angle relative to the side supports and to support keyboards of various widths all without the necessity of cross bracing between the end supports. As will later be more fully described, the keyboard stand 10 of the invention easily assembles and disassembles to allow for easy storage and transportation.

Referring now to FIGS. 1-6, further details of keyboard stand 10 will be described. Since corresponding elements of each side support 12, 12' are identical, only the elements of side support 12 will be described. Base 14 (as best seen in FIGS. 3, 4 and 5) is preferrably formed of tubular stock aluminum and includes front base section 26 and rear base section 28. Rear base section 28 is formed at an obtuse angle relative to front base section 26, as best seen in FIG. 4. Strut receiving member 30 mounted on front base section 26 is preferrably formed of two aluminum pieces. Strut receiving member 30, shown in detail in FIG. 5 includes arcuate plate 32, formed with holes 34, through which rivets or screws are passed to mount arcuate plate 32 to front section 26, and cylindrical member 36 formed with slot 36a. Arcuate plate 32 is preferrably welded to cylindrical members 36 forming an acute angle with base 14. Rear section 28 of base 14 is formed with an internally threaded sleeve (not shown) welded into rear section 28 to receive bolt 28a used to secure second strut member 18 to base 14. Bolt 28a is formed with a large plastic head to allow it to be tightened by hand. Strut receiving member 30' is constructed in the same manner as strut receiving member 30 and the same components are indicated by prime reference numerals.

First strut member 16 constructed in the same way as first strut member 16', is also preferrably formed of tubular stock aluminum and is formed with an internally threaded sleeve (not shown) welded into the side thereof near the bottom of strut 16 and an internally threaded sleeve (not shown) welded into the side thereof near the top of Strut 16. The bottom internally threaded sleeve receives bolt 16a, and the top internally threaded sleeve receives bolt 16b, both formed with large plastic heads to facilitate tightening by hand.

Figure 7:
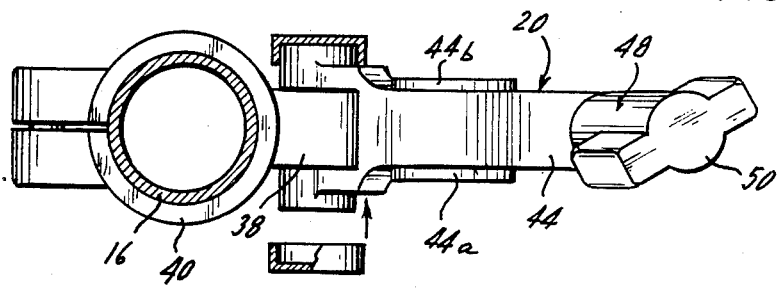
FIG. 7 is a top partial section of the clamp assembly means shown in FIG. 6.
Figure 6:
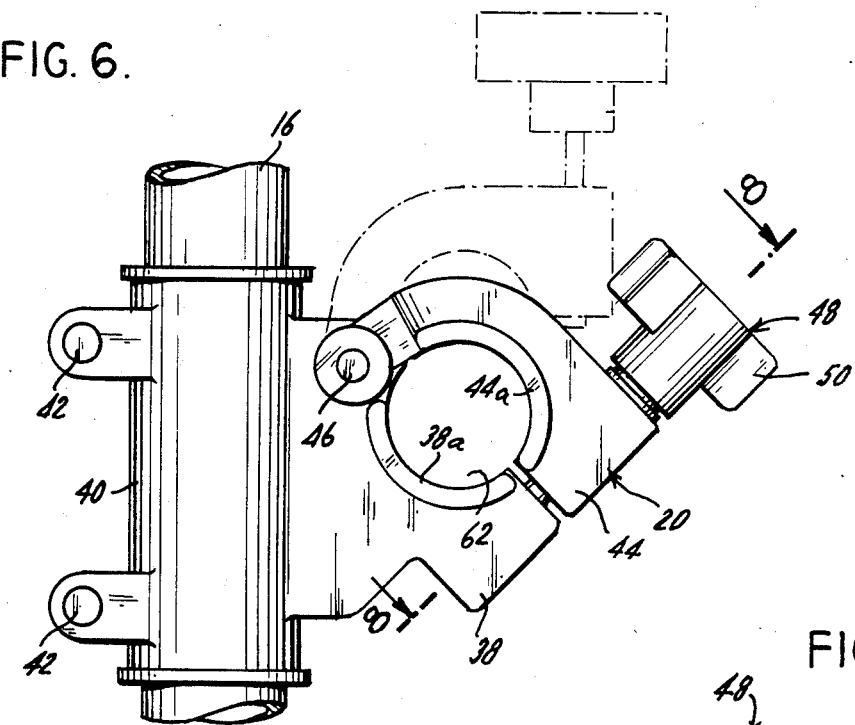
FIG. 6 is a detailed side elevational view of the clamp assembly means shown in the closed position in full lines and in the open position, for receiving a spar, in dotted lines.
Figure 8:
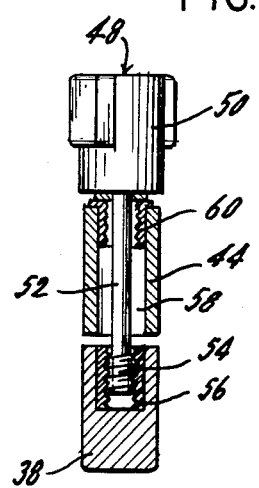
FIG. 8 is a sectional view taken along the line 8—8 of FIG. 6.

Referring now to FIGS. 6-8, clamp assembly means 20 preferrably molded from ABS plastic, containing 20% glass fibers for additional strength, comprises three major sections: stationary jaw 38 formed with clamping member 40, which receives bolts in bolt receiving holes 42 to permit clamp assembly means 20 to be secured to first strut member 16, movable jaw 44 mounted for pivotal movement relative to stationary jaw 38 about an axis centrally located on rivet 46, which secures movable jaw 44 to stationary jaw 38; and bolt 48 which when tightened, prevents movement of movable jaw 44 relative to stationary jaw 38. Movable jaw 44 and stationary jaw 38 are formed with widened jaw areas 44a, 44b and 38a, 38b respectively (FIGS. 6, 7) to provide increased gripping strength for securing cross spar 22. Bolt 48 is formed with plastic head 50, designed to allow bolt 48 to be sufficiently tightened without the need for tools. Shaft 52, (FIG. 8) which has threaded portion 54 which is received in cooperatively formed threads in threaded sleeve 56 molded into stationary jaw 38. Movable jaw 38 is formed with cavity area 58 and threaded sleeve 60 molded into movable jaw 44 so that threaded portion 54 of bolt 48 can be unscrewed from threaded sleeve 56 of stationary jaw 38 and be retracted into cavity area 58 to allow cross spar 22 to be inserted into the jaw area 62 of clamp assembly means 20 and prevent bolt 48 from being removed from movable jaw 44 unless threaded portion 54 is unscrewed through threaded sleeve 60.

Referring to FIGS. 3-5, second strut member 18 is preferrably formed of tubular stock aluminum with flattened end 64 on the top and flattened end 66 on the bottom (FIGS. 4, 5). Flattened end 64 contains hole 68 and flattened end 66 contains hole 70 used for mounting second strut member 18 to first strut member 16 and base 14, respectively. It is understood that second strut member 18' is identical to second strut member 18.

Referring now to FIGS. 1-5, to assemble side support 12, bolt 16b is removed from first strut member 16 by being unscrewed therefrom. Clamping member 40 of stationary jaw 38 is slipped over first strut member 16 and secured thereto by bolts extending through holes 42. Bolt 16a of first strut member 16 is loosened and first strut member 16 is inserted into strut receiving member 30 so that bolt 16a is aligned with slot 36a of cylindrical member 36 (FIG. 5). Tightening of bolt 16a secures first strut member 16 to base 14. To assemble second strut member 18 to side support 12, bolt 16b of first strut member 16 and bolt 28a of rear base section 28 are unscrewed, respectively. Bolt 16b is inserted through hole 68 of flattened end 64 of second strut member 18 and rethreaded into first strut member 16. Bolt 28a is inserted through hole 70 of flattened end 66 of second strut memeber 18 and rethreaded into rear base section 28. During assembly, all bolts can be sufficiently tightened by hand. Side support 12' is assembled in an identical manner to side support 12. As will be appreciated by persons skilled in the art, the configuration of bases 14, 14' with front base sections 26, 26' and rear base sections 28, 28', first strut members 16, 16' and second strut members 18, 18' provides lateral support for keyboard stand 10 without the use of cross bracing between side supports 12, 12'.

Referring to FIGS. 1, 2 and 4, cross spar 22 is also preferrably formed of tubular stock aluminum and is formed with holes 72. Cross bar 22 supports keyboard supports 24, 24' preferrably formed of rigid stock material, such as aluminum or steel and which includes keyboard stops 74, 74', respectively, to prevent keyboards from slipping off keyboard stand 10 and holes 76 which receive conventional bolts 78 with spacers 80 (FIG. 4) received in selected holes 72 in cross spar 22 to mount keyboard supports 24, 24' to cross spar 22. Spacers 80 are preferrably formed of rigid plastic with an arcuate surface on the bottom side and a flat surface on the top side to securely maintain keyboard supports 24, 24' on cross spar 22. The combination of conventional bolts 78 and spacers 80 allow keyboard supports 24, 24' to pivot on cross spar 22 to be either parallel to cross spar 22 during storage and transportation of keyboard 10 or non parallel to cross spar 22 while supporting a keyboard.

Referring now to FIGS. 2-4, to erect keyboard stand 10 side supports 12, 12' are placed a desired distance apart and cross spar 22 is supported intermediate its ends by two cooperatively arranged clamp assembly means 20, 20', mounted on side supports 12, 12' respectively, as shown in FIG. 2. Cross spar 22 is installed in clamp assembly means 20 as previously described, by loosening bolt 48 on clamp assembly means 20 and pivoting movable jaw 44 upward, away from stationary jaw 38 as shown in dotted lines in FIG. 6. Cross spar 22 is placed in stationary jaw 38 and secured in clamp assembly means 20 by tightening bolt 48. Installation of cross spar 22 in clamp assembly means 20' occurs in a similar manner.

The advantages of clamp assembly means 20, 20' will be described by reference to clamp assembly means 20 (FIG. 6–8), although it is understood that clamp assembly means 20' works in cooperation with clamp assembly means 20 and all operations described for clamp assembly means 20 must similarly be performed on clamp assembly means 20'.

The configuration of clamp assembly means 20 whereby jaw area 62 is in front of the plane formed by first strut member 16, 16', allows side supports 12, 12' to be positioned closer or farther away from one another without changing the length of cross spars or without disassembling keyboard stand 10. To vary the distance between side supports 12, 12' it is only necessary to turn bolt 48 of clamp assembly means 20 counterclockwise to loosen the grip clamp assembly means 20 has on cross spar 22, freeing end supports 12, 12' to be repositioned closer or farther away from each other, as desired. When side supports 12, 12' are repositioned at the desired location, bolt 48 of clamp assembly means 20 can be turned clockwise to once again secure cross spar 22 to clamp assembly means 20, 20'. Cross spar 22 can be rotated relative to end supports 12, 12' to permit a keyboard to be supported at any angle relative to end supports 12, 12' by loosening bolts 48 on clamp assembly means 20, 20' rotating cross spar 22 to the desired angle and retightening bolts 48, 48'.

The keyboard stand 10 further allows cross spars to be easily added or removed as desired, without dissembling keyboard stand 10. A cross spar is removed simply by loosening bolt 48 of clamp assembly means 20, retracting threaded area 54 of bolt 48 up into cavity area 58 of movable jaw 44 (FIG. 8) and pivoting movable jaw 44 upward as shown by the dotted lines in FIG. 6. A cross spar is inserted by reversing this procedure. Cross spars of different and varying lengths can similarly be added to keyboard stand 10.

While what has been described is the presently preferred embodiment of the invention, it will be apparent to those skilled in the art that modifications and changes can be made to the invention while keeping within the spirit and scope thereof which is set forth in the appended claims.

I claim:

1. An adjustable keyboard stand comprising a first and second side support, each of said side supports comprising a base adapted to be supported on a horizontal surface, each base being formed to provide stability to said stand without the need for cross-braces between said side supports and having a front base section and a rear base section, said rear base section formed at an obtuse angle relative to said base section, said rear base sections diverging from each other, a first strut member removably connected to said front base section and extending upwards from said base, a second strut member removably connected to said rear base section and extending upwards from said base rearward of said first strut member and removably secured to said first strut member to support said first strut member in an upright position, at least one clamp assembly means mounted but maintained at all times tightly on each of said first strut members, at least one cross spar supported by a pair of said clamp assembly means cooperatively acting to support said cross spar, said cross spar supported by said clamp assembly means forward of said first strut of said first and second side supports and keyboard support means mounted to said cross bar to support at least one keyboard so that said first and second side supports can be moved towards and away from one another to accommodate keyboards of varying lengths.

2. An adjustable keyboard stand comprising a first and a second side support, each of said side supports comprising a base adapted to be supported on a horizontal surface, each base being formed to provide stability to said stand without the need for cross-braces between said side support and having a front base section and a rear base section, said rear base section formed at an obtuse angle relative to said front base section, said rear base sections diverging from each other, said front base section formed with a strut receiving member formed at an acute angle relative to said base, a first strut member adapted to be removably connected to said front base section at said strut receiving member and extending upwards from said base, a second strut member formed of tubular stock with flattened ends and adapted to be removably connected to said rear base section and extending upwards from said rear base section and adapted to be removably secured to aid first strut member to support said first strut member in an upright position, at least one clamp assembly means adjustably mounted but maintained at all times on tightly each of said first strut members comprising a stationary jaw member formed with a clamping member adapted for mounting said clamp assembly means to said first strut member, a movable jaw mounted for pivotal movement to said stationary jaw and clamping means mounted to said clamp assembly means and adapted to prevent movement of said movable jaw relative to said stationary jaw, at least one cross spar adapted to be received in and supported by a pair of said clamp assembly means cooperatively acting to support said cross spar and keyboard support means mounted to said cross spar and adapted to support at least one keyboard so that said first and second side supports can be moved towards and away from one another to accommodate keyboards of varying lengths and so that said keyboard stand may be easily and rapidly disassembled for storage and transportation without the use of tools.

3. An adjustable keyboard stand comprising a first and a second side support, each of said side supports comprising a base adapted to be supported on a horizontal surface, each base being formed to provide stability to said stand without the need for cross-braces between said side supports and having a front base section and a rear base section, said rear base section formed at an obtuse angle relative to said front base section, said rear base sections diverging from each other, a first strut member adapted to be removably connected to said front base section and extending upwards from said base, a second strut member adapted to be removably connected to said rear base section and extending upwards from said base rearward of said first strut member and adapted to be removably secured to said first strut member to support said first strut member in an upright position, at least one clamp assembly means adapted to be adjustably mounted, but maintained at all times tightly on each of said first strut members, at least one cross spar adapted to be received in and supported by a pair of said clamp assembly means cooperatively acting to support said cross spar forward of said first strut members of said first and second side supports and keyboard support means adapted to be mounted to said cross spar and adapted to support at least one keyboard so that said front and second side supports can be moved towards or away from one another to accommodate keyboards of varying length.

4. The adjustable keyboard stand of claim 1 wherein each of said clamp assembly means comprises a stationary jaw member formed with a clamping member adapted to adjustably mount said clamp assembly means at a predetermined region along said first strut member, a movable jaw mounted for pivotal movement to said stationary jaw and a clamping member mounted to said clamp assembly means and adapted to prevent movement of said movable jaw relative to said stationary jaw, said stationary jaw and said movable jaw forming a jaw opening, said jaw opening being positioned in front of the vertical plane formed by said first strut members when said clamping assembly means is mounted to said first strut member, said cross spar adapted to be received in said jaw openings of a pair of clamp assembly means cooperatively mounted on each of said first strut members to permit said cross spar to extend beyond said side supports and support said cross spar at any two points along the length of said cross spar.

5. The adjustable keyboard stand of claim 1 wherein said keyboard support means are pivotally mounted to said cross spar and adapted to be positioned parallel to said cross spar during storage and adapted to be positioned non-parallel to said cross spar when supporting a keyboard.

6. The adjustable keyboard stand of claim 1 wherein said base, said first and second strut members and said cross spar are formed of tubular material.

* * * * *